F. GARACA.
BATTERY.
APPLICATION FILED JUNE 18, 1918.
1,316,836.
Patented Sept. 23, 1919.
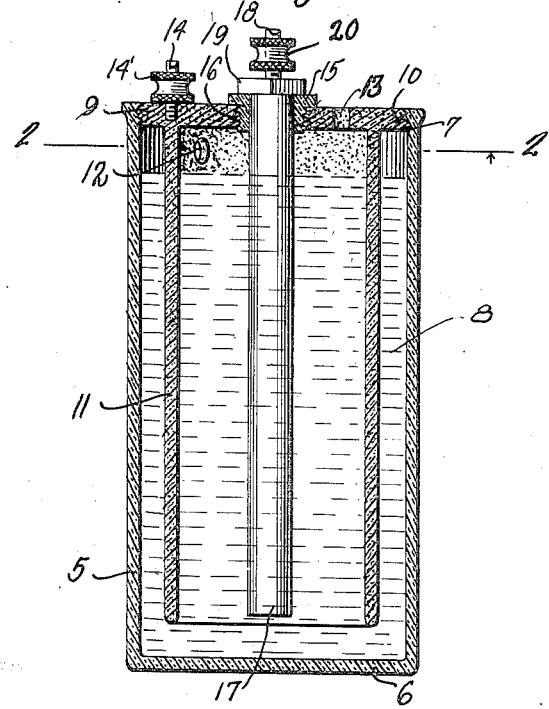
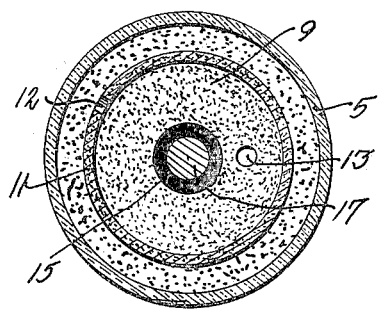
Witnesses
Guy M. Spring
H. D. Vrooman
Inventor
Frank Garaca
By Richard B. Owen,
Attorney

UNITED STATES PATENT OFFICE.

FRANK GARACA, OF CLEVELAND, OHIO.

BATTERY.

1,316,836. Specification of Letters Patent. Patented Sept. 23, 1919.

Application filed June 18, 1918. Serial No. 240,573.

*To all whom it may concern:*

Be it known that I, FRANK GARACA, a citizen of the United States, residing at Cleveland, in the county of Cuyahoga and State of Ohio, have invented certain new and useful Improvements in Batteries, of which the following is a specification.

This invention is a battery and has for its principal object the production of what is commonly known as "primary" batteries wherein the battery will be so simple and inexpensive as to be capable of ordinary commercial application and have a comparatively light weight.

Another object of this invention is the production of a storage battery wherein the carbon electrode is releasably supported within the jar in such manner as to efficiently support the metallic electrode to allow the electrode to extend into the electrolyte within the jar.

Another object of this invention is the production of a storage battery wherein the carbon electrode consists of a cap having a cylindrical sleeve extending therefrom, whereby the cap may be screwed into engagement with the jar to allow the sleeve to extend into the jar, the metallic electrode being carried by an insulating bushing connected to the cap, whereby binding posts may be carried by the cap and also by the metallic electrode for allowing conductors to lead therefrom, while a reaction will be involved between the electrodes and the electrolyte within the jar for generating an electric current.

Broadly stated the invention consists of a cell or jar in which are a pair of electrodes, one of which is aluminum and the other carbon, and an electrolyte composed of a suitable halogen salt—*i. e.*, a fluorid or a chlorid or both—an acid and preferably in practice a depolarizing agent.

One practical form of construction and assembly of the present invention will be herinafter described and is illustrated in the accompanying drawing, in which—

Figure 1 is a central vertical section through the battery, and

Fig. 2 is a section taken on the line 2—2 of Fig. 1.

In the preferred embodiment of the present invention, about to be described, it will be seen that 5 designates a jar, which is formed from any suitable insulating material, such for instance as glass and it is obvious this jar may be any shape or design, although it is preferably cylindrical, as shown in Fig. 2 and is provided with a closed bottom 6 which supports the same, and has an open upper end. The jar 5 is internally threaded as indicated at 7 at its upper end, for purposes to be hereinafter set forth while the jar contains a suitable electrolyte indicated in general at 8 and made as follows: water, three pounds, nitric acid (38%), two pounds, and bichromate of potash, two pounds, are well mixed and allowed to cool. About six ounces of calcium fluorid (fluor-spar) is then added, and the solution is allowed to stand about six or eight hours to allow the calcium fluorid to dissolve. Afterward the electrodes are then placed in the jar and the battery is ready for use.

The carbon electrode consists of a disklike cap 9 which is threaded upon its periphery as indicated at 10, whereby the same may be screwed into engagement with the threaded portion of the jar 5 for closing the upper end of this jar. This cap 9 has an elongated cylindrical sleeve 11 formed thereon and extending from the inner surface thereof, whereby the sleeve 11 may be passed into the interior of the jar 5, as shown clearly in the drawing. Thus it will be seen that this sleeve will extend into the electrolyte 8, although it will be noted that the sleeve is considerably smaller than the jar 5 and for this reason may be spaced from the sides of the jar and also from the bottom 6 thereof, as shown in Fig. 1. The sleeve 11 is provided with a vent opening 12, adjacent its upper portion, while the cap 9 is provided with a vent opening 13, thus permitting gas which may form within the battery to escape through the vent opening 12 and 13. It will also be noted that the binding posts 14 having a nut 14' is fixed upon the cap 9 and constitutes a connecting means for a conductor 16 connected thereto.

An insulating bushing 15, which is externally threaded as indicated at 16 is screwed into the central portion of the cap 9, as illustrated in Fig. 1. This bushing therefore is a non-conducting support for the metallic electrode 17.

This metallic electrode 17 is preferably an elongated bar of aluminum which extends centrally through the bushing 15 and has a stem 18 extending from its upper end upon which a supporting nut 19 and a binding nut 20 are carried. The supporting nut 19 engages the insulating bushing 15 and thus supports the electrode 17, while the nut 20 permits a conductor to be positively bound in engagement with the stem 18. This electrode 17 extends inwardly into the jar within the sleeve 11 and into the electrolyte 8, although spaced from the sleeve and it will be noted that it is insulated from the cap 9 by the bushing 15.

It is not wished to hazard any theories as to the exact chemical action of the cell, but apparently the calcium fluorid is dissolved but not decomposed by the solution and seems to form a coating over the aluminum electrode which protects it to a great degree from the action of the solution which is the active element and acting upon the electrodes forms the electric current, although as above stated the calcium fluorid tends to protect the aluminum electrode while the sleeve of the carbon electrode will produce an enlarged structure which will last longer than an ordinary bar of carbon, thus prolonging the life of the cell. When a battery is desired for producing very strong current for closed circuit work, it is desirable to add about four ounces zinc chlorid or other soluble chlorid to the solution above described as constituting the electrolyte of the cell. It should be understood that other changes may be made in the composition of the electrolyte without departing from the spirit of the invention. For instance any soluble fluorid or chlorid may be used that is not decomposed by the acid employed or any suitable depolizer may be substituted for bichromate of potash.

When conductors are connected to the binding posts above described it will be found that the difference of potential of about one and one half volts is created and that a current will flow in the external circuit. The provision of the vent openings 12 and 13 herein described will allow any gases which may arise in the battery to escape thus preventing injury to the battery.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described the invention, what I claim as new and desire to secure by Letters Patent, is:—

In a battery of the character described, the combination of a jar having a closed bottom, and an open upper end, said jar being internally threaded at its open end, and having a suitable electrolyte therein, a carbon electrode, consisting of a disk like closure cap having a threaded periphery, said cap being screwed into engagement with the threaded portion of said jar to pass down into the interior of the jaw and form a closure for the open end thereof, a cylindrical sleeve extending from said cap to extend downwardly into said jar to be positioned within the electrolyte, said cap having a vent opening therein, said sleeve having a vent opening adjacent the end thereof, contiguous to the cap so that gas forming within the jar may pass from either side of said sleeve through said vent opening, an insulating bushing carried by the central portion of said cap, and a metallic electrode consisting of an elongated aluminum bar carried by said bushing and extending into said jar centrally within said sleeve, said metallic electrode also extending into said electrolyte, and binding posts carried by said cap and said metallic electrode.

In testimony whereof I affix my signature in presence of two witnesses.

FRANK GARACA.

Witnesses:
L. M. FARLIN,
G. KLOKOW.